US011017175B2

(12) United States Patent
Han

(10) Patent No.: US 11,017,175 B2
(45) Date of Patent: May 25, 2021

(54) METHOD, DEVICE AND SYSTEM FOR ANALYZING COMMENT DATA ABOUT TARGET

(71) Applicant: BOE Technology Group Co., Ltd., Beijing (CN)

(72) Inventor: Litong Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 192 days.

(21) Appl. No.: 16/243,531

(22) Filed: Jan. 9, 2019

(65) Prior Publication Data

US 2019/0236141 A1  Aug. 1, 2019

(30) Foreign Application Priority Data

Jan. 29, 2018 (CN) .......................... 201810085690.3

(51) Int. Cl.
*G06F 40/30* (2020.01)
*H04L 12/58* (2006.01)

(52) U.S. Cl.
CPC ............ *G06F 40/30* (2020.01); *H04L 51/046* (2013.01)

(58) Field of Classification Search
None
See application file for complete search history.

(56) References Cited

U.S. PATENT DOCUMENTS

2016/0205207 A1* 7/2016 Backstrom ........ G06F 17/30867
                                               709/224
2017/0220578 A1* 8/2017 Kazi ....................... G06F 40/30
2017/0249384 A1* 8/2017 Kandylas .............. G06F 16/334

FOREIGN PATENT DOCUMENTS

CN          101667194 A     3/2010
CN          102208077 A     10/2011
CN          106127507 A     11/2016

OTHER PUBLICATIONS

First Office Action, including Search Report, for Chinese Patent Application No. 201810085690.3, dated Mar. 2, 2021, 15 pages.

* cited by examiner

*Primary Examiner* — Nafiz E Hoque
(74) *Attorney, Agent, or Firm* — Westman, Champlin & Koehler, P.A.

(57) ABSTRACT

A method, a device, a system for analyzing comment data about a target are provided. The method includes acquiring the comment data about the target in accordance with a link to the target; and analyzing the comment data and determining a comment topic and a comment viewpoint about the target.

15 Claims, 10 Drawing Sheets fetchJSON_comment98vv33({"productAttr":null,"productCommentSummary":
{"goodRateShow":100,"poorRateShow":0,"poorCountStr":"0","averageScore":5,"generalCountStr":"0","showCount":16,"showCountStr":"6","goodCount":10,"generalCount":10,"generalRate":0.0,"skuId":10886006125,"goodCountStr":10886006125,"goodCountStr":"10+","poorRate":0.0,"afte
[{"id":1432802,"name":" pretty ","status":0,"rid":3474,"productId":10886006125,"count":2,"created":"2016-12-03 11:53:02","modified":"2017-02-10 10:19:19","type":0,"canBeFiltered":false},{"id":1432803,"name":"full function"
,"status":0,"rid":3477,"productId":10886006125,"count":2,"created":"2016-12-03 11:53:02","modified":"2017-02-10 10:19:19","type":0,"canBeFiltered":false},{"id":1432804,"name":"high clarity"
,"status":0,"rid":3475,"productId":10886006125,"count":1,"created":"2016-12-03 11:53:02","modified":"2016-12-03 11:53:02","type":0,"canBeFiltered":false},{"id":1474979,"name":"clear picture"
,"status":0,"rid":3466,"productId":10886006125,"count":1,"created":"2017-02-10 10:19:19","modified":"2017-02-10
10:19:19","type":0,"canBeFiltered":false}],"jwotestProduct":"99","maxPage":2,"score":0,"soType":5,"imageListCount":16,"vTagStatistics":[],"comments":[{"id":2092590754,"guid":"7a157278-68c7-4419-9c62-c05274148560","content":"product leading a trend,
enhance level of your home, best gift, accurate color, fine quality of manufacture, improving quickly despite of shortcomings, good prospect, add oil    "creationTime":"2016-12-05

Fig. 2

METHOD, DEVICE AND SYSTEM FOR ANALYZING COMMENT DATA ABOUT TARGET

CROSS-REFERENCE TO RELATED APPLICATION

The present application claims a priority of a Chinese patent application No. 201810085690.3 filed in China on Jan. 29, 2018, a disclosure of which is incorporated herein by reference in its entirety.

TECHNICAL FIELD

The present disclosure relates to a field of electronic business technology, and in particular, relates to a method, a device and a system for analyzing comment data about a target.

BACKGROUND

With development of electronic business, online shopping plays an important role in daily life of consumers. Meanwhile, the online shopping also brings convenience for the consumers.

A large amount of commodities are exhibited by manufacturers and vendors on e-commerce platforms. A service for commenting a commodity is provided by most of the e-commerce platforms, so as to facilitate the customers to make comments on a quality, a usage, or the like of a commodity purchased online and to evaluate experience of using the commodity purchased online accurately. A vendor may acquire, from a large amount of comment data, a consumption tendency of the customers and advantages and disadvantages of the commodity, and then improve the commodity according to the comment data so as to increase sales of the commodity.

When analyzing the comment data of the commodity, if the comment data cannot be organized and analyzed effectively, a analysis result obtained may be messy.

SUMMARY

A method for analyzing comment data about a target, a device for analyzing the comment data about the target, the system for analyzing the comment data about the target, and a nonvolatile computer-readable storage medium are provided in the present disclosure.

In a first aspect, the method for analyzing the comment data about the target provided in the present disclosure includes acquiring the comment data about the target in accordance with a link to the target; and analyzing the comment data and determining a comment topic and a comment viewpoint about the target.

Optionally, the method further includes acquiring an overall assessment about the target in accordance with the comment topic and the comment viewpoint.

Optionally, the analyzing the comment data and determining the comment topic and the comment viewpoint about the target includes analyzing the comment data and acquiring the comment topic about the target; and determining the comment viewpoint about the target in accordance with the comment data and the comment topic.

Optionally, the analyzing the comment data and acquiring the comment topic about the target includes: analyzing the comment data in accordance with a type of the target, and acquiring the comment topic about the target.

Optionally, subsequent to the acquiring the comment data about the target, the method further includes: storing the comment data in a structured manner, wherein the comment data stored in the structured manner is a piece of data.

Optionally, the analyzing the comment data and determining the comment topic and the comment viewpoint about the target includes: splitting the comment data stored in the structured manner and acquiring a plurality of comment contents corresponding to the target; and analyzing the plurality of comment contents sequentially and determining a comment topic and a comment viewpoint about each of the plurality of comment contents.

Optionally, the splitting the comment data stored in the structured manner and acquiring the plurality of comment contents corresponding to the target includes: splitting the comment data stored in the structured manner through a predetermined word segmentation system, and acquiring the plurality of comment contents corresponding to the target; or splitting the comment data stored in the structured manner through a predetermined word segmentation filter, and acquiring the plurality of comment contents corresponding to the target, wherein the predetermined word segmentation filter includes at least one of a historical comment topic or a historical comment viewpoint.

Optionally, the analyzing the plurality of comment contents sequentially and determining the comment topic and the comment viewpoint about each of the plurality of comment contents includes: comparing each of the plurality of comment contents with a predetermined topic database and determining the comment topic about each of the plurality of comment contents; and comparing each of the plurality of comment contents with a predetermined viewpoint database and determining the comment viewpoint about each of the plurality of comment contents.

Optionally, the method further includes acquiring a total amount of the comment data and establishing an amount histogram in accordance with the total amount of the comment data; and determining a variation trend of the comment data in accordance with the amount histogram, and exhibiting the variation trend visually.

Optionally, the target is an online article.

Optionally, the acquiring the comment data about the target in accordance with the link to the target includes: acquiring a link corresponding to the comment data about the online article in accordance with the link to the online article; and acquiring the comment data about the online article in accordance with the link corresponding to the comment data.

Optionally, the acquiring the link corresponding to the comment data about the online article in accordance with the link to the online article includes: acquiring a sales link to the online article; and acquiring the link corresponding to the comment data about the online article from the sales link through a crawler.

Optionally, the acquiring the link corresponding to the comment data about the online article in accordance with the link to the online article includes: acquiring a link to the online article on a third-party recommendation platform; and acquiring the link corresponding to the comment data about the online article from the link to the online article on the third-party recommendation platform through a crawler.

Optionally, prior to the acquiring the comment data about the target in accordance with the link to the target, the method further includes: setting a frequency of acquiring the comment data, a time period of acquiring the comment data, and a storage mode of the comment data.

In a second aspect, the device for analyzing the comment data about the target in the present disclosure includes a first acquisition main circuit configured to acquire the comment data about the target in accordance with a link to the target; and a first determination main circuit configured to analyze the comment data acquired by the first acquisition main circuit and determine a comment topic and a comment viewpoint about the target.

Optionally, the device further includes a storage configured to, after the first acquisition main circuit has acquired the comment data about the target, store the comment data in a structured manner, wherein the comment data stored in the structured manner is a piece of data, and the first determination main circuit is further configured to acquire an overall assessment about the target in accordance with the comment topic and the comment viewpoint.

Optionally, the first determination main circuit is further configured to: analyze the comment data and acquire the comment topic about the target, and determine the comment viewpoint about the target in accordance with the comment data and the comment topic.

Optionally, the device further includes a second acquisition main circuit, configured to acquire a total amount of the comment data; an establishment main circuit, configured to establish an amount histogram in accordance with the total amount of the comment data acquired by the second acquisition main circuit; a second determination main circuit, configured to determine a variation trend of the comment data in accordance with the amount histogram established by the establishment main circuit; and an exhibition main circuit, configured to visually exhibit the variation trend determined by the second determination main circuit.

In a third aspect, the system for analyzing the comment data about the target in the present disclosure includes a processor and a storage, wherein, the storage is configured to store programs and data executable by the processor, the processor is configured to execute the programs and the data stored in the storage so as to implement the method according to the first aspect.

In a fourth aspect, the nonvolatile computer-readable storage medium in the present disclosure includes computer instructions stored on the nonvolatile computer-readable storage medium, wherein when the computer instructions are executed by a processor, the processor implements the method according to the first aspect.

BRIEF DESCRIPTION OF THE DRAWINGS

Advantages and benefits of the present disclosure will become apparent to a person skilled in the art through following detailed description of optional embodiments of the present disclosure. Drawings are used for illustratively showing the optional embodiments of the present, but are not used as limiting the present disclosure. A same reference sign in the drawings represent a same element throughout the drawings. In the drawings.

FIG. 2 is a schematic view of an example of the comment data about the target according to some embodiments of the present disclosure;

DETAILED DESCRIPTION

Figure 1:
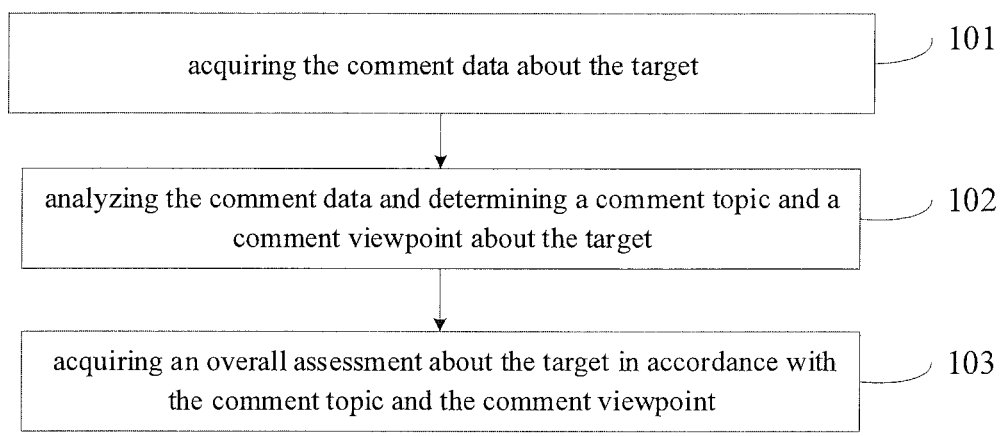
FIG. 1 is a flowchart of a method for analyzing comment data about a target according to some embodiments of the present disclosure.

Exemplary embodiments of the present disclosure will be described hereinafter in details with reference to drawings. Although the exemplary embodiments are shown in the drawings, it should be understood that the present disclosure may be achieved in various ways and should not be limited to the embodiments set forth herein. On the country, the embodiments are provided for purpose of more thoroughly understanding the present disclosure and conveying the scope of the present disclosure to one of ordinary skills in the art completely.

Some embodiments of the present disclosure provide a method for analyzing comment data about a target, a device for analyzing comment data about a target and a system for analyzing comment data about a target, so as to acquire the comment data about the target from an e-commerce platform rapidly and accurately, analyze the comment data effectively, determine a comment topic and a comment viewpoint corresponding the comment data, and adjust an online article in accordance with a result of the analysis, so as to respond to rapid market changes effectively.

The method for analyzing the comment data about the target provided in the present disclosure may be applied to the device and the system for analyzing the comment data about the target. As shown in FIG. 1, the method for analyzing the comment data about the target includes steps 101 and 102.

Step 101: acquiring the comment data about the target.

The target in some embodiments of the present disclosure may be an online article, and a type of the online article is not particularly limited in the present disclosure.

The system for analyzing the comment data about the target may acquire the comment data in various ways. For example, the system for analyzing the comment data about the target may acquire the comment data through a comment link to the target in an e-commerce platform (e.g., a sales link to an e-commerce platform such as 'www.jd.com', 'www.taobao.com' or 'www.amazon.com') or a comment link to the target in a third-party recommendation platform (an article recommendation platform such as www.smzdm.com). In the embodiments of the present disclosure, the ways for acquiring the comment data about the target are not particularly limited. The link mentioned in the embodiments of the present disclosure may be any link adopted in an Internet sales platform, e.g., a sales link or a web page link.

In order to increase an efficiency of acquiring the comment data, acquiring through a crawler may be optionally adopted in some embodiments of the present disclosure. However, it should be noted that, the present disclosure does not intend to define acquiring the comment data about the target merely through the crawler, and any other way through which the comment data may be acquired also falls within the scope of the present disclosure.

In some embodiments of the present disclosure, a premise that the system for acquiring the comment data about the target acquires the comment data about the target is that the system for acquiring the comment data about the target may analyze the comment data about the target from an e-commerce platform to which the system belongs or from other e-commerce platforms. A demander needing an analysis result may provide the link to the comment data about the target, and perform settings in the system for analyzing the comment data about the target. For example, the system for analyzing the comment data about the target is developed and used normally by a merchant A, the system may not only acquire and analyze comment data about all targets sold by the merchant A online on different sales platforms, and but also acquire and analyze comment data about targets sold by other merchants such as a merchant B, a merchant C and a merchant D online on the sales platform.

In some embodiments of the present disclosure, the acquired comment data about the target may be all comment data behind the link corresponding to the target, or comment data about the target within a certain time period, or comment data about the target from specific customers. Contents of the comment data are not particularly defined herein.

FIG. 2 is a schematic diagram of an example of the comment data about the target, e.g., a display device sold online on a certain sales platform, provided in some embodiments of the present disclosure. In FIG. 2, the comment data includes specific contents, a creation time of a comment, a user identity (ID), a comment level and a picture of the target. The comment data in FIG. 2 is for illustrative purposes only, and formats of the comment data may be different on different sales platforms.

Step 102: analyzing the comment data and determining a comment topic and a comment viewpoint about the target.

For example, after acquiring contents shown in FIG. 2, the comment data about the target may be analyzed so as to determine the comment topic corresponding to the comment data, and thereby to determine the comment viewpoint about the target in accordance with the comment data and the comment topic. During a specific implementation, comment topics for different types of targets may be different. The comment data shown in FIG. 2 is about the display device. The comment topic for the display device may include appearance, color, system and definition, and corresponding comment viewpoints may be, e.g., beautiful appearance, accurate color reproduction, deficiencies of the system, and high definition.

In actual use, depending on the types of the targets, the comment topics and the comment viewpoints about the targets may be determined in different ways. For example, when the target is an edible article (e.g., fruit), the comment topics may include freshness, appearance, taste, price, or the like; and the corresponding comment viewpoints are related to the comment topics and may include "the fruit is very fresh or sweet" or "the fruit is cheaper than that in a supermarket". When the target is a vehicle, the comment topics may include appearance, interiors, performance and vehicle body, and the comment viewpoints corresponding to the comment topics may include "the vehicle has a fashionable style", "the vehicle has a steering wheel that may be heated automatically" or "the vehicle is fuel-efficient". In the embodiments of the present disclosure, the types, the comment topics and the comment viewpoints about the target are not particularly defined.

Upon determining the comment topics about the target, the comment viewpoints may be classified into three types, i.e., a favorable comment, a medium comment and a negative comment. In case that the above three types of comment viewpoints cannot be obtained directly from the comment data, a predetermined word library which is generated in advance may be needed to assist in determining the comment topic and/or the comment viewpoint, wherein the word library generated in advance is generated according to experience or historical comments of users.

Optionally, subsequent to Step 102, the method further includes a step 103.

Step 103: acquiring an overall assessment about the target in accordance with the comment topic and the comment viewpoint.

To be specific, if a quantity of the comment viewpoints biased toward the favorable comment is greater than a quantity of the comment viewpoints biased toward the negative comment with respect a same comment topic of a same target, the overall assessment about the target may be determined as the favorable comment. If different weights are assigned to different comment topics and different viewpoints when determining the overall assessment about the target, then the overall assessment about the target may be determined in accordance with values of the weights.

According to the method for analyzing the comment data about the target in the embodiments of the present disclosure, after the system for analyzing the comment data about the target has acquired the comment data about the target, the comment data may be analyzed by the system so as to determine at least one of the comment topic or the comment viewpoint about the target. Thus, the comment topic and the comment view point about the target may be determined efficiently in some embodiments of the present disclosure, and thereby the target may be adjusted in real time in accordance with the comment topic and the comment viewpoint, and the market change may be rapidly responded to.

Figure 3:
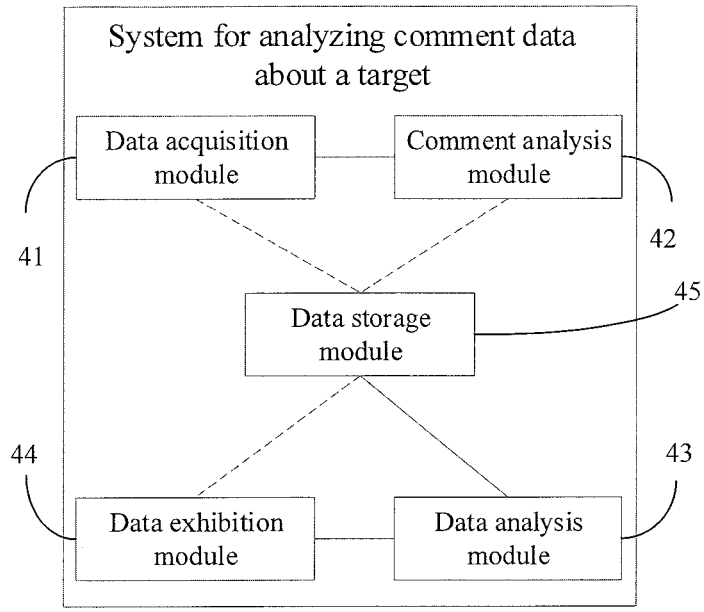
FIG. 3 is a structural schematic view of a system for analyzing comment data about a target according to some embodiments of the present disclosure.

When the system for analyzing the comment data about the target performs the method shown in FIG. 1, various modules in the system is needed. In some embodiments of the present disclosure, the system may include a data acquisition module 41, a comment analysis module 42, a data storage module 45, a data analysis module 43 and a data exhibition module 44, as shown in FIG. 3. FIG. 3 is a structural schematic diagram of the system for analyzing the comment data about the target provided in some embodiments of the present disclosure. The data acquisition module 41 is principally configured to acquire the comment data, and transmit, after acquiring the comment data successfully, the comment data to the comment analysis module 42 and the data storage module 45. The comment analysis module 42 is configured to classify and determine the comment topics and determine the comment viewpoints. The data storage module 45 is configured to store the comment data. After the comment analysis module 42 completes processing (i.e., the classifying and the determining), the comment analysis module 42 is configured to transmit, to the data analysis module 43, the comment data having been processed, so that the data analysis module 43 may analyze the comment data at a macroscopic level and transmit an analysis result of the comment data to the data exhibition module 44. The data exhibition module 44 is configured to exhibit the analysis result in a visualized manner, so as to make a tendency of the comment viewpoints about the target be viewed easily, to manage the target effectively in accordance with the tendency of the comment viewpoints, and to adjust a sales mode for the target or a design of the target in time.

Figure 4:
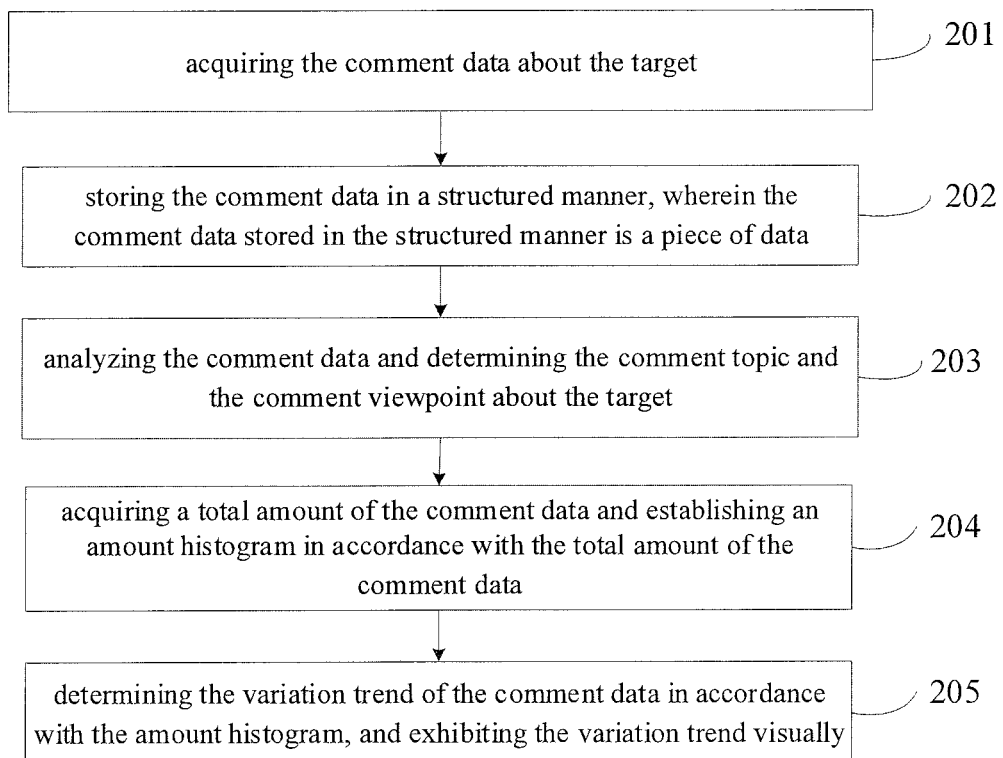
FIG. 4 is another flow chart of the method for analyzing the comment data about the target according to some embodiments of the present disclosure.

With respect to the system in FIG. 3, some embodiments of the present disclosure further provide another example of the method for analyzing the comment data about the target. As shown in FIG. 4, the method includes steps 201 to 205.

Step 201: acquiring the comment data about the target.

The target is an online article, and when acquiring the comment data about the online article, a link corresponding to the comment data about the online article may be acquired in accordance with a link to the online article, and the comment data about the online article may be acquired in accordance with the link corresponding to the commend data. In some embodiments of the present disclosure, the link to the online article may include a sales link to the online article and a link in the third-party recommendation platform. The links in different platforms will be described hereinafter in more details.

(1) The comment data is acquired through the sales link to the online article.

An administrator of the system for analyzing the comment data about the target may manually set the sales link corresponding to the online article. The system may access an online sales webpage for the online article in accordance with the set sales link, and analyze the online sales webpage, so as to acquire the link corresponding to the comment data about the online article. All comment data about the online article is recorded in the link.

In actual applications, after the sales link to the target is set, the link corresponding to the comment data about the target may be obtained through a crawler in accordance with the sales link, or may be set manually. However, in order to increase an efficiency of acquire the link corresponding to the comment data about the target, the crawler may be adopted optionally in some embodiments of the present disclosure. It should be appreciated that, the present disclosure does not intend to define that the link corresponding to the comment data about the target may be obtained merely through the crawler.

Figure 5:
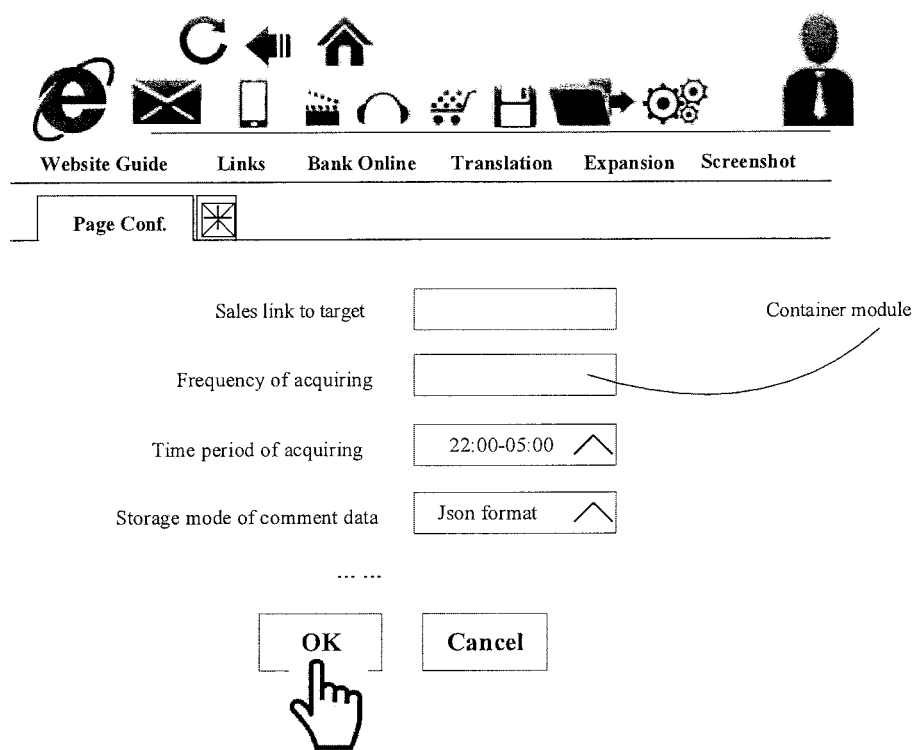
FIG. 5 is a schematic view of setting a page in the method for analyzing the comment data about the target according to some embodiments of the present disclosure.

For example, after the administrator has acquired a login privilege for the system for analyzing the comment data, a setting webpage shown in FIG. 5 may be provided. FIG. 5 is a schematic diagram of a setting webpage provided in some embodiments of the present disclosure. In a user level, the administrator may input the sales link to the target in an input box (a container module) for the sales link to the target, and then click an "OK" button and configuration for the sales link is finished. In a machine level, the system for analyzing the comment data may receive the sales link to the target inputted by the administrator through the module container, and after the system receives an instruction indicating that the "OK" button has been triggered, the configuration for the sales link is finished. The administrator is a user capable of acquiring the login privilege for the system for analyzing the comment data, but is not a specific user or specific users.

As shown in FIG. 5, a frequency of acquiring the comment data, a time period of acquiring the comment data, and a storage mode of the comment data may also be set in the setting webpage besides the sales link.

When setting the frequency of acquiring the comment data, if the comment data about a certain target has a relatively large data volume, the frequency of acquiring the comment data may be set to be larger relatively; and if the comment data about a certain target has a relatively small data volume, the frequency of acquiring the comment data may be set to be smaller relatively. For example, the frequency of acquiring the comment data may be set as 100 times per minute.

When setting the time period of acquiring the comment data, the time period of acquiring the comment data may be set as a time period within which fewer processing resources are occupied, e.g., 22:00 to 05:00 or 24:00 to 06:00, in order to prevent normal operations of other functions of the system from being adversely affected by acquiring the comment data.

When setting the storage mode of the comment data, a storage mode which may facilitate performing data analysis is usually selected. For example, the storage mode of the comment data may be set as a json format or an XML format. Specific setting modes for setting the sales link, the frequency of acquiring the comment data, the time period of acquiring the comment data, and the storage mode of the comment data are not particularly defined in the embodiments of the present disclosure.

After the setting has been completed in the setting webpage in FIG. 5, the system may acquire the link corresponding to the comment data about the target from the sales link through the crawler in accordance with the frequency and the time period of acquiring the comment data having been set. As an implementation in some embodiments of the present disclosure, in order to optimize a speed of acquiring the comment data through the crawler, the comment data may be acquired in a distributed manner, i.e., acquisition strategies may be distributed in different network environments (e.g., Third Generation (3G), Fourth Generation (4G) and Fifth Generation (5G) mobile communication systems adopting different standards), so as to increase an efficiency of acquiring the comment data.

(2) The comment data is acquired through the link in the third-party recommendation platform.

Unlike acquiring the comment data through the sales link to the online article, when the comment data is acquired through the link in the third-party recommendation platform, the comment data about the online article probably has been analyzed preliminarily by the third-party recommendation platform. The preliminary analysis may not be the comment topics and the comment viewpoints about the online article mentioned in some embodiments of the present disclosure, but may include filtering of original comment data and thus data having no contribution to the analysis of the comment data, e.g., a creation time of a user account, may be filtered off.

To be specific, the system for analyzing the comment data may acquire the link to the online article in the third-party recommendation platform, and acquire the link corresponding to the comment data about the online article from the link in the third-party recommendation platform through the crawler.

Setting of the link in the third-party recommendation platform may be acquired from above description of (1) acquiring the comment data through the sales link to the online article, and is not particularly defined herein.

For purpose of clear description, description of embodiments hereinafter is provided by taking the comment data being acquired through the sales link to the online article as an example. However, it may be understood that, the present disclosure does not intend to define that the comment data may be acquired only through the sales link.

After the comment data is acquired, the comment data may be stored in a database of the system for analyzing the comment data in accordance with the storage mode of the comment data having been set. For purpose of clear description, the storage mode is described as the json format in the embodiments below. However, it should be understood that, the present disclosure does not intend to define that the storage mode may be the json format only.

In relation to the diagram of the architecture in FIG. 3, the step 201 may be executed by the data acquisition module 41.

Step 202: storing the comment data in a structured manner. The comment data stored in the structured manner may be a piece of data.

In some embodiments of the present disclosure, the system for analyzing the comment data may analyze the comment data about the target in one online sales platform or in a plurality of online sales platforms. Whatever, since the comment data uploaded by different users may be different, lengths and contents of the comment data acquired by the system may be different. In order to store the comment data from different platforms and having different data lengths in the structured manner and increase the efficiency of subsequently analyzing the comment data, the comment data acquired in the step 210 is stored in the structured manner. The structured manner mentioned in some embodiments of the present disclosure means that a json form is created, and the comment data is stored as a piece of data in the json form, wherein each piece of data may include a plurality of comment contents corresponding to the target.

In actual implementation, each piece of data in the json form may be set to have a fixed length, and the comment data may be stored in accordance with the fixed length of each piece of data. Optionally, the comment data may also be stored in accordance with a publication time of the comment data. Modes of storing the comment data in the json form are not particularly defined in the embodiments of the present disclosure. In order to differentiate different online articles from each other, all comment data about each of the online articles may be stored in a same document.

In relation to the diagram of the architecture in FIG. 3, the step 202 may be executed by the data storage module 45.

Step 203: analyzing the comment data and determining the comment topic and the comment viewpoint about the target.

Figure 6:
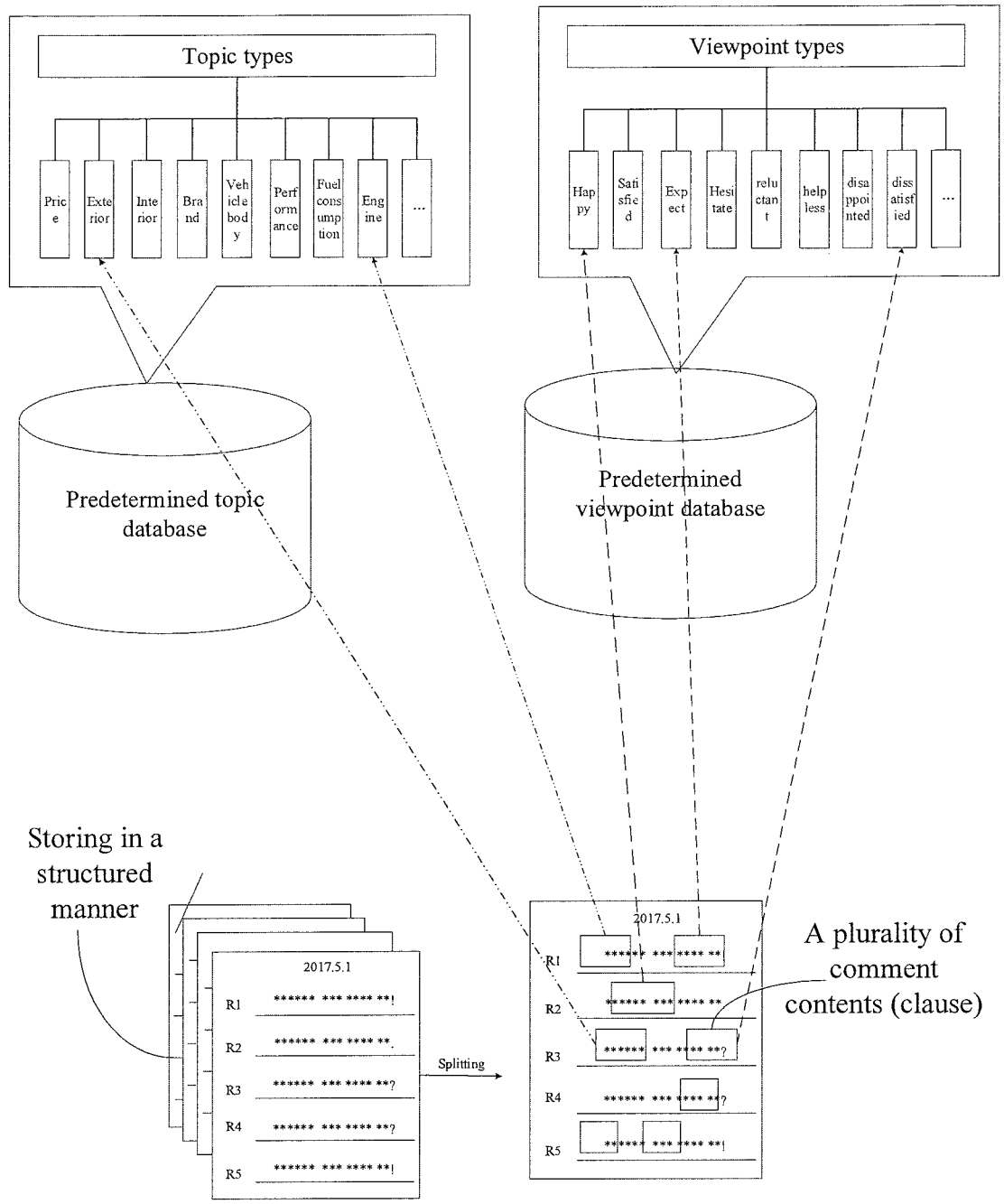
FIG. 6 is a schematic view of determining a comment topic and a comment viewpoint about the target in the method for analyzing the comment data about the target according to some embodiments of the present disclosure.

As shown in FIG. 6, FIG. 6 is a schematic diagram of determining the comment topic and the comment viewpoint about the target in the method according to some embodiments of the present disclosure. In an application scene corresponding to the present disclosure, the target is a vehicle. The system for analyzing the comment data may split the comment data stored in the structured manner into the plurality of comment contents corresponding to the target firstly.

When splitting the comment data, the comment data may be split through the following two modes, but the present disclosure is not limited to the two modes.

First Mode: splitting the comment data stored in the structured manner into the plurality of comment contents corresponding to the target through a predetermined word segmentation system.

Each piece of comment data stored in the structured manner may be split into a plurality of clauses (i.e., the plurality of comment contents) in accordance with punctuation marks. The plurality of clauses split from the comment data is shown in FIG. 6. Optionally, each piece of data stored in the structured manner may be split into a plurality of clauses (i.e., the plurality of comment contents) according to any known word segmentation method in the related art. The word segmentation method is not particularly limited in the embodiments of the present disclosure.

Second Mode: the comment data stored in the structured manner may be split into a plurality of comment contents corresponding to the target through a predetermined word segmentation filter.

In some embodiments of the present disclosure, the predetermined word segmentation filter may include historical comment topics and/or historical comment viewpoints. A piece of comment data stored in the structured manner may be input into the predetermined word segmentation filter, so that the predetermined word segmentation filter may filter the piece of comment data and output corresponding content in the comment data in accordance with the historical comment topics and/or the historical comment viewpoints, i.e., the piece of comment data is split into the plurality of comment contents.

After the plurality of clauses (i.e., the plurality of comment contents) is acquired through any one of the above-mentioned word segmentation methods, the plurality of comment contents may be analyzed sequentially, so as to determine a comment topic and a comment viewpoint corresponding to each of the comment contents. That is, each of the comment contents may be compared with a predetermined topic database, so as to determine the comment topic for each of the comment contents. For example, the predetermined topic database includes, but is not limited to: price (luxury, taste and quality), exterior (headlamp, vehicle body, tail lamp, style and appearance), interior (large screen, electrically driven, safety, seat, and steering wheel), brand (a vehicle produced by a domestic enterprise, a vehicle produced by a joint venture enterprise, and an imported vehicle), type (SUV, car and off-road vehicle), performance (fuel-efficient, environmentally fried, automatically, and central control), fuel consumption (fuel-efficient, endurance), engine (single turbine, dual turbines, naturally aspirated, and hybrid), and audio/video (full-range speaker, liquid crystal display for rear seats). When the comment content matches any comment topic in the topic database, the comment topic corresponding to the comment content may be determined.

After the comment topic is determined, each of the comment contents may be compared with a predetermined viewpoint database, so as to determine the comment viewpoint for the comment content. For example, the predetermined viewpoint database may include, but is not limited to, being delighted (very good, magnificent, well-appearance, easy to use, worthy, and beautiful), being satisfied (not bad, advanced, attractive and very good), to be expected (expect to see), being hesitated (under consideration, and a little hesitant), being reluctant (not too bad, comparatively well, acceptable, and ordinary), being helpless ("anyhow I have brought it", "I cannot return it", and "just a lesson"), being disappointed (merely, pity, and speechless), being dissatisfied (rubbish, points deducted, cheap copy, being disgraced, being vulgar, nothing special, no excuse, and out of patience), no special tendency (without any positive or negative viewpoints), and the like. When the comment content matches any viewpoint in the predetermined viewpoint database or matches semantics of any viewpoint in the viewpoint database, the comment viewpoint for the comment content may be determined.

Finally, the overall assessment about the target may be acquired in accordance with the comment topic and the comment viewpoint. For example, with respect to the same comment topic about the same target, assuming that the quantity of the comment viewpoints biased toward the favorable comment is greater than the quantity of the comment viewpoints biased toward the negative comment, the overall assessment about the target may be determined as the favorable comment. In addition, when determining the overall assessment about the target, different weights may be assigned to different comment topics and different comment viewpoints, and then the overall assessment about the target may be determined in accordance with the values of the weights.

Figure 7:
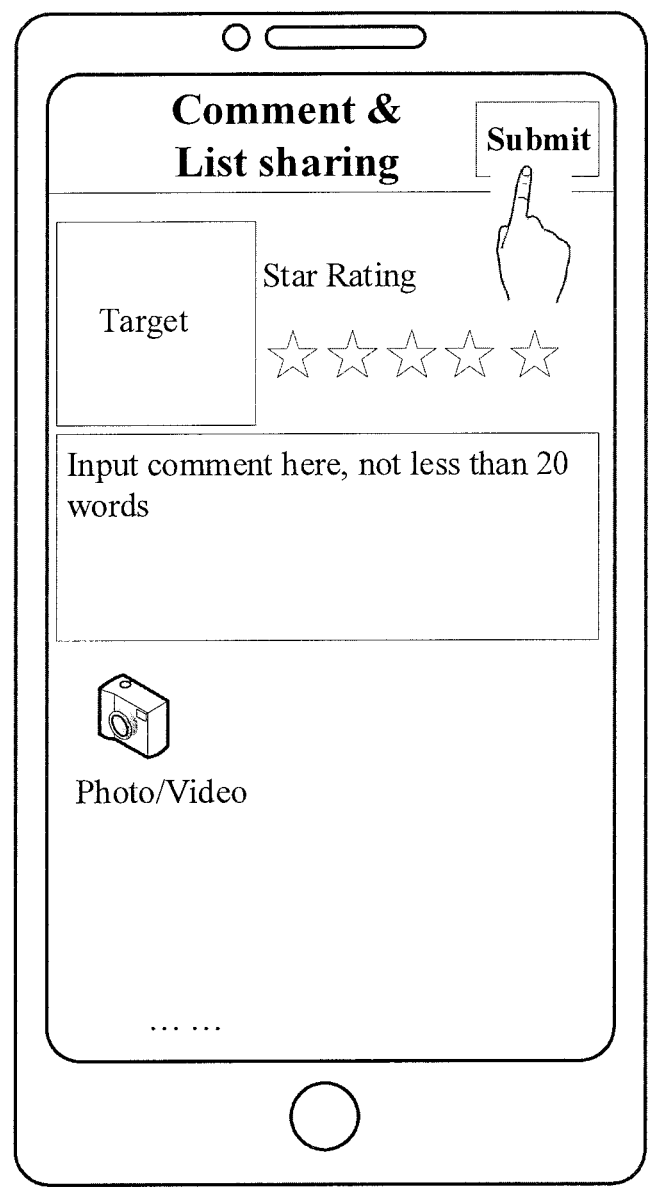
FIG. 7 is a schematic view of a submission interface for the comment data in the method for analyzing the comment data about the target according to some embodiments of the present disclosure.

After the target has been sold on the online sales platform, a submission interface for the comment data may be provided as shown in FIG. 7. FIG. 7 is a schematic diagram of a submission interface for the comment data according to some embodiments of the present disclosure. A user may give a star rating star at a star rating area and/or input the comment data in an input box for inputting the comment data. The user may click a Submission button in FIG. 7 so as to release the comment data.

The star rating is a part of the comment data. In some embodiments of the present disclosure, the star rating may be a five-star rating. When the star rating is greater than or equal to three stars, the comment data may be determined as being biased toward the favorable comment, and when the star rating is smaller than three stars, the comment data may be determined as being biased toward the negative comment.

Figure 8:
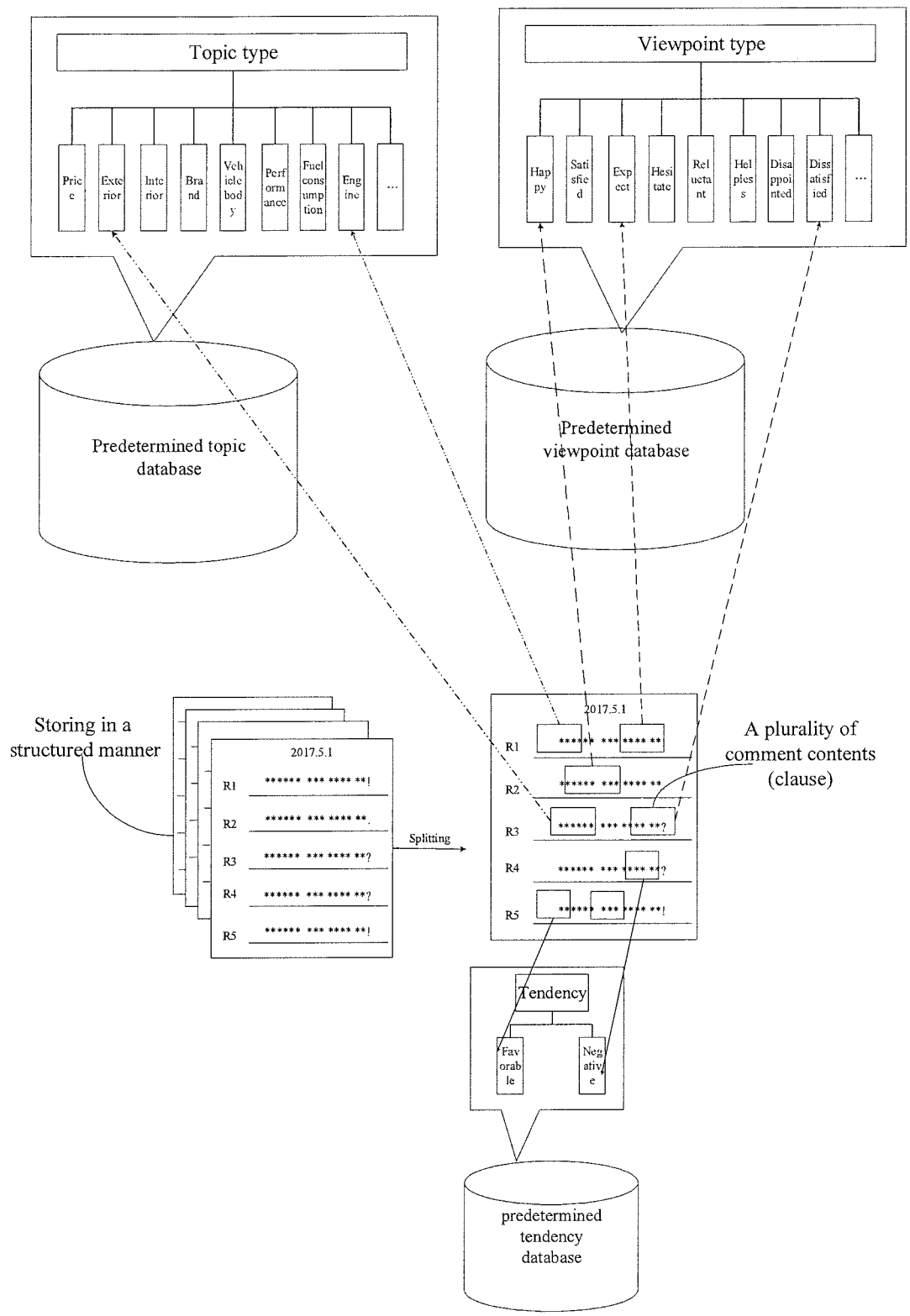
FIG. 8 is another schematic view of determining the comment topic and the comment viewpoint about the target in the method for analyzing the comment data about the target according to some embodiments of the present disclosure.

As an implementation of some embodiments of the present disclosure, as shown in FIG. 8, FIG. 8 is another schematic diagram of determining comment topics and comment viewpoints about the target in some embodiments of the present disclosure. In this implementation, besides the predetermined topic database and the predetermined viewpoint database, a predetermined tendency database is also referenced, the predetermined tendency database may be determined in accordance with the star rating and may include the favorable comment and the negative comment.

In relation to the diagram of the architecture shown in FIG. 3, the step 203 may be executed by the comment analysis module 42.

Step 204: acquiring a total amount of the comment data and establishing an amount histogram in accordance with the total amount of the comment data.

Figure 9:
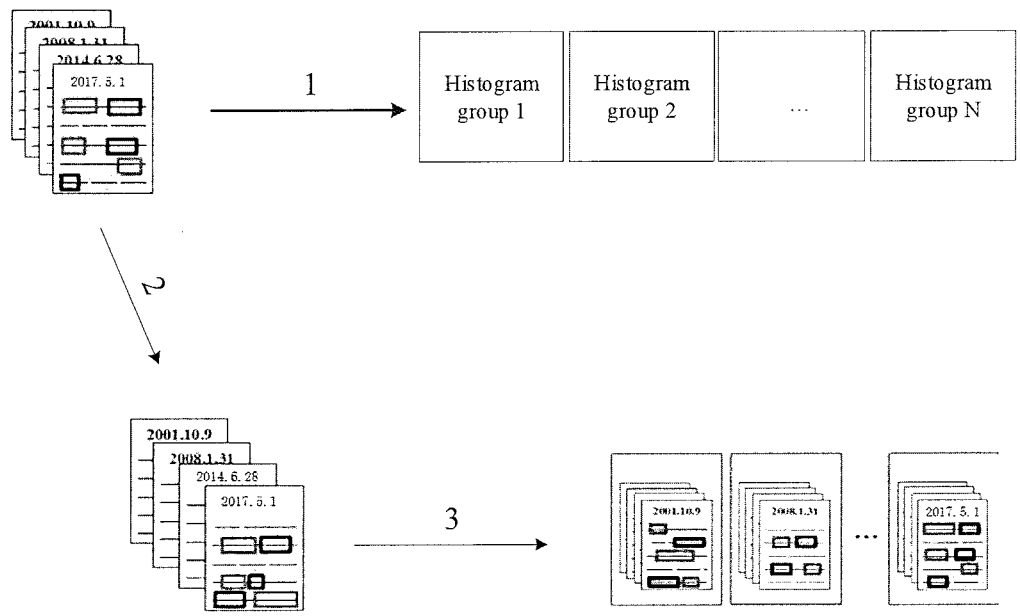
FIG. 9 is a schematic view of establishing a histogram in accordance with a total amount of the comment data in the method for analyzing the comment data about the target according to some embodiments of the present disclosure.

In the acquired comment data, there may exist such a situation where the amount of the comment data within a certain time period is relatively large while the amount of the comment data within another time period is relatively small. When a variation trend of the comment data is exhibited simply on a monthly basis, an error may be generated in the assessment of the target. In view of this, after the total amount of the comment data is acquired in some embodiments of the present disclosure, the amount histogram may be established in accordance with the total amount of the comment data, as shown in FIG. 9. FIG. 9 is a schematic diagram of establishing the amount histogram in accordance with the total amount according to some embodiments of the present disclosure. When establishing the amount histogram, groups in the histogram may be obtained through using a Sturges' formula or an experiential rooting method, wherein N in FIG. 9 is a positive integer greater than 2. After the groups in the histogram is obtained, all comment data may be ranked in a chronological order and added into each of the group. In this way, an effectiveness of statistically calculating the comment data may be enhanced. Using the Sturges' formula or the experiential rooting method to obtain the groups in the histogram is known for one skilled in the art, and thus will not be particularly defined herein.

In relation to the diagram of the architecture in FIG. 3, the step 204 may be executed by the data analysis module 43.

Step 205: determining the variation trend of the comment data in accordance with the amount histogram, and exhibiting the variation trend visually.

Subsequent to the step 204, the variation trend of the comment data may be determined in accordance with the amount histogram, and then may be exhibited visually. The variation trend may be exhibited visually through manners including, but not limited to, a line chart, a table, a bar chart and a pie chart. Visual exhibition may make the variation trend of the target on a corresponding e-commerce platform be viewed easily, and accordingly remind a merchant to adjust, e.g., update, publicize, or promote, the target in time.

In relation to the diagram of the architecture in FIG. 3, the step 205 may be executed by the data exhibition module 44.

Figure 10:
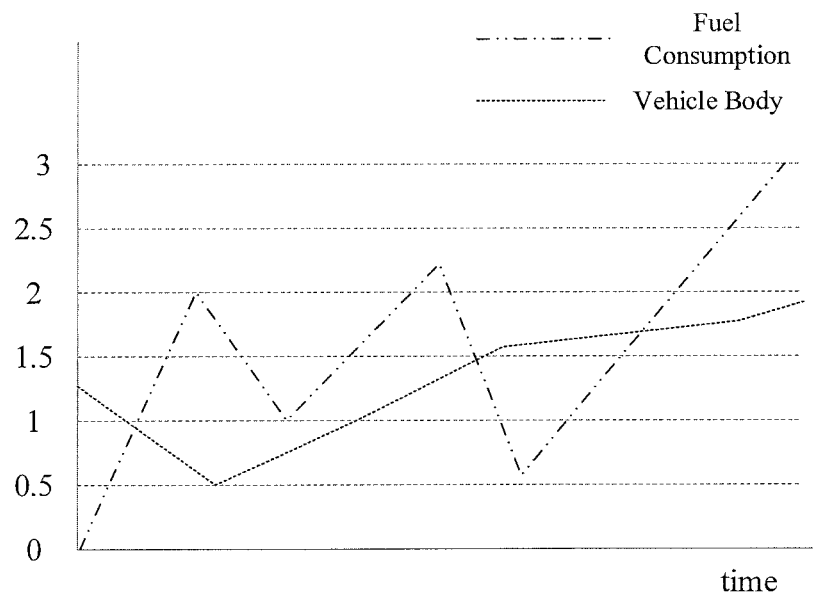
FIG. 10 is a schematic view of visually exhibiting the comment data in the method for analyzing the comment data about the target according to some embodiments of the present disclosure.

For purpose of facilitating understanding, the overall assessment is based on the weights determined in accordance with the predetermined topic database, the predetermined viewpoint database and the predetermined tendency database, as shown in FIG. 10. FIG. 10 is a schematic diagram of the visual exhibition in case that the fuel consumption and the vehicle body are taken as the comment topics. As can be seen in conjunction with FIGS. 3 and 4, various modules shown above in the system for analyzing the comment data may cooperate with each other when analyzing the comment data.

Further, in order to implement the above method, the present disclosure further provides a device for analyzing the comment data about the target. The device corresponds to the above method. For sake of clarification, details in description of the method are not repeated in description of the device. It should be appreciated that, the device in the present disclosure is capable of implementing all of the above-mentioned steps in the method.

Figure 11:
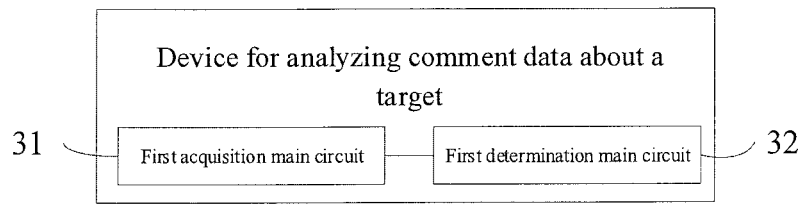
FIG. 11 is a structural block diagram of a device for analyzing comment data about a target according to some embodiments of the present disclosure.

Some embodiments of the present disclosure further provide a device for analyzing the comment data about the target. As shown in FIG. 11, the device for analyzing the comment data about the target includes a first acquisition main circuit 31 and a first determination main circuit 32. The first acquisition main circuit 31 is configured to acquire the comment data about the target in accordance with a link to the target. The first determination main circuit 32 is configured to analyze the comment data acquired by the first acquisition main circuit 31 and determine the comment topic and the comment viewpoint about the target.

Optionally, the first determination main circuit 32 is further configured to acquire the overall assessment about the target in accordance with the comment topic and the comment viewpoint.

Figure 12:
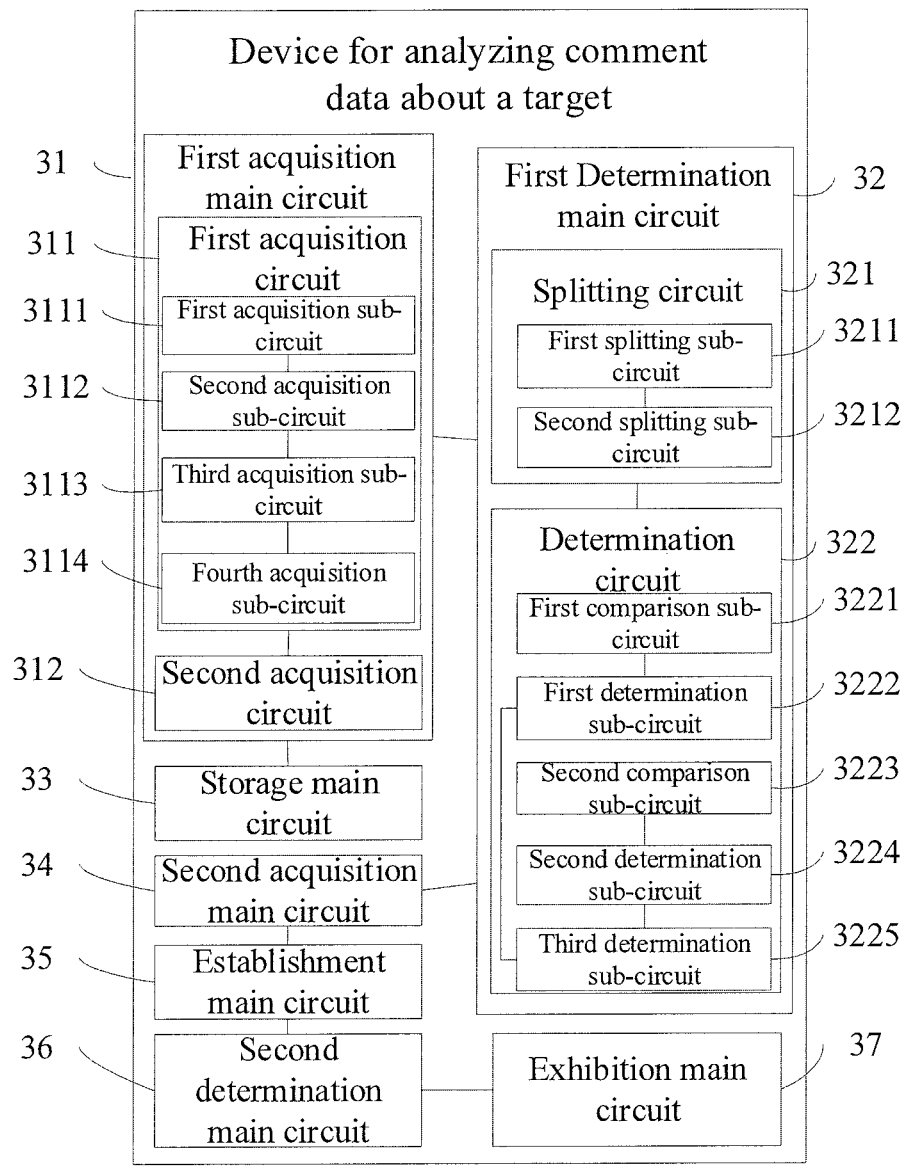
FIG. 12 is another structural block diagram of the device for analyzing the comment data about the target according to some embodiments of the present disclosure.

Further, as shown in FIG. 12, the device further includes a storage 33 configured to, after the first acquisition main circuit 31 has acquired the comment data about the target, store the comment data in the structured manner.

Optionally, the first determination main circuit 32 is further configured to analyze the comment data and acquire the comment topic about the target; and is configured to determine the comment viewpoint about the target in accordance with the comment data and the comment topic.

In addition, as shown in FIG. 12, the first determination main circuit 32 includes a splitting circuit 321 and a determination circuit 322. The splitting circuit 321 is configured to split the comment data stored in the structured manner and acquire a plurality of comment contents corresponding to the target. The determination circuit 322 is configured to sequentially analyze the plurality of comment contents acquired by the splitting circuit and determine the comment topic and the comment viewpoint of each of the plurality of comment contents.

Furthermore, as shown in FIG. 12, the splitting circuit 321 includes a first splitting sub-circuit 3211 and a second splitting sub-circuit 3212. The first splitting sub-circuit 3211 is configured to split the comment data stored in the structured manner by using the predetermined word segmentation system and acquire the plurality of comment contents corresponding to the target. The second splitting sub-circuit 3212 is configured to split the comment data stored in the structured manner by using the predetermined word segment filter and acquire the plurality of comment contents corresponding to the target. The predetermined word segmentation filter includes the historical comment topics and/or the historical comment viewpoint.

Further, as shown in FIG. 12, the determination circuit 322 includes a first comparison sub-circuit 3221, a first determination sub-circuit 322, a second comparison sub-circuit 3223, a second determination sub-circuit 3224, and a third determination sub-circuit 3225. The first comparison sub-circuit 3221 is configured to compare each of the comment contents with the predetermined topic database. The first determination sub-circuit 3222 is configured to determine the comment topic of each of the comment contents when the first comparison sub-circuit 3221 compares each of the comment contents with the predetermined topic database. The second comparison sub-circuit 3223 configured to compare each of the comment contents with the predetermined viewpoint database. The second determination sub-circuit 3224 is configured to determine the comment viewpoint of each of the comment contents when the second comparison sub-circuit 3223 compares each of the comment contents with the predetermined viewpoint database. The third determination sub-circuit 3225 is configured to acquire the overall assessment about the target in accordance with the comment topic determined by the first determination sub-circuit 3222 and the comment viewpoint determined by the second determination sub-circuit 3224.

Further, as shown in FIG. 12, the device further includes a second acquisition main circuit 34, an establishment main circuit 35, a second determination main circuit 36, and an exhibition main circuit 37. The second acquisition main circuit 34 is configured to acquire the total amount of the comment data. The establishment main circuit 35 is configured to establish the amount histogram in accordance with the total amount of the comment data acquired by the second acquisition main circuit 34. The second determination main circuit 36 is configured to determine the variation trend of the comment data in accordance with the amount histogram established by the establishment main circuit 35. The exhibition main circuit 37 is configured to visually exhibit the variation trend determined by the second determination main circuit 36.

Further, the target is the online article.

Further, as shown in FIG. 12, the first acquisition main circuit 31 includes a first acquisition circuit 311 and a second acquisition circuit 312. The first acquisition circuit 311 is configured to acquire the link corresponding to the comment data about the online article in accordance with the link to the online article. The second acquisition circuit 312 is configured to acquire the comment data about the target in accordance with the link corresponding to the comment data acquired by the first acquisition circuit 311.

Further, as shown in FIG. 12, the first acquisition circuit 311 includes a first acquisition sub-circuit 3111 and a second acquisition sub-circuit 3112. The first acquisition sub-circuit 3111 is configured to acquire the sales link to the online article. The second acquisition sub-circuit 3112 is configured to acquire the link corresponding to the comment data about the online article from the sales link through the crawler.

Further, as shown in FIG. 12, the first acquisition circuit 311 includes a third acquisition sub-circuit 3113 and a fourth acquisition sub-circuit 3114. The third acquisition sub-circuit 3113 is configured to acquire the link to the online article in the third-party recommendation platform. The fourth acquisition sub-circuit 3114 is configured to acquire the link corresponding to the comment data about the online article from the link in the third recommendation platform through the crawler.

Figure 13:
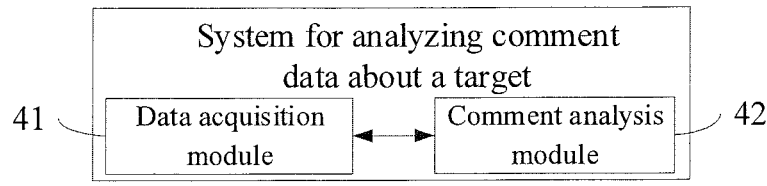
FIG. 13 is a structural block diagram of a system for analyzing the comment data about the target according to some embodiments of the present disclosure.

Some embodiments of the present disclosure further provide the system for analyzing the comment data about the target. As shown in FIG. 13, the system includes the data acquisition module 41 and the comment analysis module 42. The data acquisition module 41 is configured to acquire the comment data about the target. The comment analysis module 42 is configured to analyze the comment data acquired by the data acquisition module and determine the comment topic and the comment viewpoint about the target.

Figure 14:
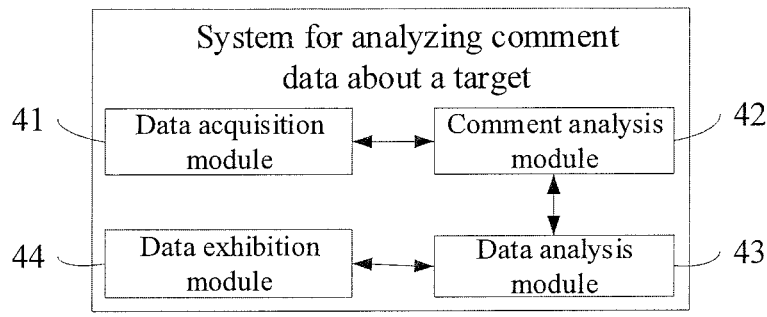
FIG. 14 is another structural block diagram of the system for analyzing the comment data about the target according to some embodiments of the present disclosure.

Further, as shown in FIG. 14, the system further includes the data analysis module 43 and the data exhibition module 44. The data analysis module 43 is configured to acquire the total amount of the comment data, establish the amount histogram in accordance with the total amount of the comment data, and determine the variation trend of the comment data in accordance with the amount of the histogram. The data exhibition module 44 is configured to visually exhibit the variation trend determined by the data analysis module.

According to the device and the system for analyzing the comment data about the target in the embodiments of the present disclosure, after the system has acquired the comment data about the target, the comment data may be analyzed so as to determine the comment topic and the comment viewpoint about the target. As compared with the related art, the comment topic and the comment viewpoint about the target may be determined efficiently, thereby to adjust the target in real time in accordance with the comment topic and the comment viewpoint and respond to rapid market changes effectively.

Figure 15:
FIG. 15 is yet another structural block diagram of the device for analyzing the comment data about the target according to some embodiments of the present disclosure.

Optionally, referring to FIG. 15, the present disclosure further provides the device for analyzing the comment data about the target (e.g., the online article). The device includes a processor 501 and a storage 502. The storage 502 is configured to store programs executable by the processor 501. The processor 501 is configured to, when executing the programs stored in the storage 502, achieve functions and steps implemented by the above-mentioned first acquisition main circuit, the second acquisition main circuit, the storage, the second acquisition main circuit, the establishment main circuit, the second determination main circuit and the exhibition main circuit. The functions and the steps of the main circuits, the circuits and the sub-circuits have been described hereinabove, and thus will not be repeated herein.

The processor 501 includes one or more cores configured to call the programs stored in the storage. The comment data may be analyzed efficiently through adjusting parameters of each of the one or more core, so that the comment topic and the comment viewpoint corresponding to the comment data may be determined, thereby to adjust the online article in accordance with the analysis result and respond to the rapid market change effectively.

The storage 502 may include a non-transient memory, a Random Access Memory (RAM) and/or a nonvolatile memory in a computer-readable medium, e.g., a Read-Only Memory (ROM) or a flash RAM. The storage 502 may include at least one storage chip.

Some embodiments of the present disclosure further provide a storage medium including computer instructions stored in the storage medium. When the computer instructions are executed by a processor, the process implements the method for analyzing the comment data as shown in FIGS. 1 and 4.

Some embodiments of the present disclosure further provide a computer product including one or more processors. Each of the one or more processor is configured to execute a computer instruction so as to implement the method for analyzing the comment data about the target, as shown in FIGS. 1 and 4.

Figure 16:
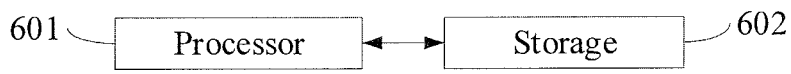
FIG. 16 is yet another structural block diagram of the system for analyzing the comment data about the target according to some embodiments of the present disclosure.

Referring to FIG. 16, some embodiments of the present disclosure provide a system for analyzing comment data about a target. The system includes a processor 601, a storage 602, and programs stored in the storage 602 and executable by the processor 601. The processor 601 is configured to, when executing the programs, acquire the comment data about the target, and analyze the comment data and determine the comment topic and the comment viewpoint about the target.

Optionally, after acquiring the comment data about the target, the processor is further configured to store the comment data in the structured manner.

Optionally, the processor being configured to analyze the comment data and determine the comment topic and the comment viewpoint about the target, further includes: the processor being configured to split the comment data stored in the structured manner and acquire the plurality of comment contents corresponding to the target; and sequentially analyze the plurality of comment contents and determine the comment topic and the comment viewpoint for each of the comment contents.

Optionally, the processor being configured to split the comment data stored in the structured manner and acquire the plurality of comment contents corresponding to the target, further includes: the processor being configured to split the comment data stored in the structured manner through the predetermined word segmentation system and acquire the plurality of comment contents corresponding to the target; or split the comment data stored in the structured manner through the predetermined word segmentation filter and acquire the plurality of comment contents corresponding to the target. The predetermined word segmentation filter includes the historical comment topics and/or the historical comment viewpoints.

Optionally, the processor being configured to sequentially analyze the plurality of comment contents and determine the comment topic and the comment viewpoint for each of the comment contents, includes: the processor being configured to compare each of the comment contents with the predetermined topic database and determine the comment topic for each of the comment contents; compare each of the comment contents with the predetermined viewpoint database and determine the comment viewpoint for each of the comment contents; and acquire the overall assessment about the target in accordance with the comment topic and the comment viewpoint.

Optionally, the processor 601 is further configured to, when executing the programs, acquire the total amount of the comment data; establish the amount histogram in accordance with the total amount of the comment data; determine the variation trend of the comment data in accordance with the amount histogram; and visually exhibit the variation trend.

Further, the target is the online article.

Optionally, the processor being configured to acquire the comment data about the target, includes the processing being configured to acquire the link corresponding to the comment data about the online article in accordance with the link to the online article; and acquire the comment data about the target in accordance with the link corresponding to the comment data.

Optionally, the processor being configured to acquire the link corresponding to the comment data about the online article in accordance with the link to the online article, includes: the processor being configured to acquire the sales link to the online article; and acquire the link corresponding to the comment data about the online article from the sales link through the crawler.

Optionally, the processing being configured to acquire the link corresponding to the comment data about the online article in accordance with the link to the online article, includes: the processor being configured to acquire the link to the online article in the third-party recommendation platform; and acquire the link corresponding to the comment data about the online article from the link in the third recommendation platform through the crawler.

The system for analyzing the comment data about the target in the present disclosure may be a server, a Personal Computer (PC), a Portable Android Device (PAD), or a mobile phone.

The present disclosure further provides a nonvolatile computer-readable storage medium which stores computer programs in the nonvolatile computer-readable storage medium. When the computer programs are executed by a processor, the processor executes steps of acquire the comment data about the target; and analyze the comment data and determine the comment topic and the comment viewpoint about the target.

According to the method, the device and the system for analyzing the comment data about the target, the comment data may be analyzed efficiently after the system for analyzing the comment data acquires the comment data about the target, and the comment topic and the comment viewpoint about the target may be determined. As compared with the relevant art, the present disclosure may effectively determine the comment topics and the comment viewpoints about the target by analysis, so that the target may be adjusted in accordance with the comment topic and the comment viewpoint in real time and the rapid market change may be responded to effectively.

It should be appreciated by one skilled in the art that, the embodiments of the present disclosure may be provided as the method, the system or the computer program product. Thus, the present disclosure may be implemented in forms of full hardware, full software, or a combination of the full hardware and the full software. In addition, the present disclosure may be implemented in a form of computer program products implemented on one or more computer-readable storage mediums (including but not limited to a disk, a Compact Disc-Read Only Memory (CD-ROM), and optical memory) including computer-executable program codes.

The present disclosure has been described with reference to the flowcharts and/or block diagrams of the method, the device (the system) and the computer program products according to the embodiments of the present disclosure. It should be understood that computer program instructions may be used to implement each of flows and/or blocks in the flowcharts and/or the block diagrams, and a combination of the flows and/or blocks in the flowcharts and/or the block diagrams. These computer program instructions may be provided to a processor of a general computer, a dedicated computer, an embedded processor or any other programmable data processing device to create machine-executable instructions, so that devices for implementing functions of one or more flows in the flowcharts and/or one or more blocks in the block diagrams may be generated when a processor of a computer or the other programmable data processing device executes the machine-executable instructions.

These computer program instructions may also be stored in a computer readable storage that may guide the computer or the other programmable data processing device to function in a certain way, so that the instructions stored in the computer readable storage may create a product including an instruction unit, the instruction unit achieves the functions of one or more flows in the flowcharts and/or one or more blocks in the block diagrams.

These computer program instructions may also be loaded in the computer or the other programmable data processing device, so that a series of operation steps may be executed on the computer or the other programmable data processing device to create processes achieved by the computer. Therefore, the instructions executed in the computer or the other programmable data processing device provide steps for achieving the functions of one or more flows in the flowcharts and/or one or more blocks in the block diagrams.

In a typical configuration, a computing device may include one or more Central Processing Units (CPUs), input/output interfaces, a network interface and a storage.

The storage may include a volatile storage, a Random Access Memory (RAM) and/or a nonvolatile storage in a computer-readable storage medium, e.g., a Read-Only Memory (ROM) or a flash RAM. The storage is an example of the computer-readable storage medium.

The computer-readable storage medium may include volatile or nonvolatile computer-readable storage medium, removable or unremovable computer-readable storage medium capable of storing therein data using any method or technique. The data may be a computer-readable instruction, a data structure, a program or any other data. The computer-readable storage medium may include, but not limited to, a Phase Change Random Access Memory (PRAM), a static Random Access Memory (SRAM) or a Dynamic Random Access Memory (DRAM), an Electrically Erasable Programmable Read Only Memory (EEPROM), a flash memory, a Compact Disc Read Only Memory (CD-ROM) or a Digital Versatile Disk (DVD), a cassette magnetic tape or a magnetic disk, or any other non-transmission medium, capable of storing therein data which may be accessed by a computing device. As defined in the present disclosure, the computer-readable storage medium may not include any transitory media, e.g., modulated data signal or carrier.

It should be noted that, such terms as "include" or "including" or any other variations involved in the present disclosure intend to provide non-exclusive coverage, so that a procedure, a method, an article or a device including a series of elements may not only include the series of element, but also include any other elements not listed herein, or may include any inherent elements of the procedure, the method, the article or the device. Without any further limitations, for the elements defined by such phrases as "including one . . . ", it is not excluded that the procedure, the method, the article or the device including the elements may also include any other identical elements.

The above embodiments are for illustrative purposes only, but the present disclosure is not limited thereto. Obviously, a person skilled in the art may make further modifications and improvements without departing from the principles and scope of the present disclosure. Any modification, equivalent replacement and the like made within the spirit and principle of the present disclosure are also included within the scope of the claims of the present disclosure.

What is claimed is:

1. A method for analyzing comment data about a target, comprising:
   acquiring the comment data about the target in accordance with a link to the target; and
   analyzing the comment data and determining a comment topic and a comment viewpoint about the target,
   wherein subsequent to the acquiring the comment data about the target, the method further comprises storing the comment data in a structured manner, wherein the comment data stored in the structured manner is a piece of data;
   the analyzing the comment data and determining the comment topic and the comment viewpoint about the target comprises:
      splitting the comment data stored in the structured manner and acquiring a plurality of comment contents corresponding to the target; and
      analyzing the plurality of comment contents sequentially and determining a comment topic and a comment viewpoint about each of the plurality of comment contents;
   the splitting the comment data stored in the structured manner and acquiring the plurality of comment contents corresponding to the target comprises:
      splitting the comment data stored in the structured manner through a predetermined word segmentation system, and acquiring the plurality of comment contents corresponding to the target; or splitting the comment data stored in the structured manner through a predetermined word segmentation filter, and acquiring the plurality of comment contents corresponding to the target, wherein the predetermined word segmentation filter comprises at least one of a historical comment topic or a historical comment viewpoint;

the analyzing the plurality of comment contents sequentially and determining the comment topic and the comment viewpoint about each of the plurality of comment contents comprises:

comparing each of the plurality of comment contents with a predetermined topic database and determining the comment topic about each of the plurality of comment contents; and comparing each of the plurality of comment contents with a predetermined viewpoint database and determining the comment viewpoint about each of the plurality of comment contents, wherein the target is an online article.

2. The method according to claim 1, further comprising:
acquiring an overall assessment about the target in accordance with the comment topic and the comment viewpoint.

3. The method according to claim 1, wherein the analyzing the comment data and determining the comment topic and the comment viewpoint about the target comprises:
analyzing the comment data and acquiring the comment topic about the target; and
determining the comment viewpoint about the target in accordance with the comment data and the comment topic.

4. The method according to claim 3, wherein the analyzing the comment data and acquiring the comment topic about the target comprises:
analyzing the comment data in accordance with a type of the target, and acquiring the comment topic about the target.

5. The method according to claim 1, further comprising:
acquiring a total amount of the comment data and establishing an amount histogram in accordance with the total amount of the comment data; and
determining a variation trend of the comment data in accordance with the amount histogram, and exhibiting the variation trend visually.

6. The method according to claim 1, wherein the acquiring the comment data about the target in accordance with the link to the target comprises:
acquiring a link corresponding to the comment data about the online article in accordance with the link to the online article; and
acquiring the comment data about the online article in accordance with the link corresponding to the comment data.

7. The method according to claim 6, wherein the acquiring the link corresponding to the comment data about the online article in accordance with the link to the online article comprises:
acquiring a sales link to the online article; and
acquiring the link corresponding to the comment data about the online article from the sales link through a crawler.

8. The method according to claim 6, wherein the acquiring the link corresponding to the comment data about the online article in accordance with the link to the online article comprises:

acquiring a link to the online article in a third-party recommendation platform; and
acquiring the link corresponding to the comment data about the online article from the link to the online article in the third-party recommendation platform through a crawler.

9. The method according to claim 1, wherein prior to the acquiring the comment data about the target in accordance with the link to the target, the method further comprises:
setting a frequency of acquiring the comment data, a time period of acquiring the comment data, and a storage mode of the comment data.

10. A device for analyzing comment data about a target, comprising:
a first acquisition main circuit configured to acquire the comment data about the target in accordance with a link to the target;
a first determination main circuit configured to analyze the comment data acquired by the first acquisition main circuit and determine a comment topic and a comment viewpoint about the target; and
a storage configured to, after the first acquisition main circuit acquires the comment data about the target, store the comment data in the structured manner, wherein the comment data stored in the structured manner is a piece of data, wherein, the first determination main circuit comprises a splitting circuit and a determination circuit, the splitting circuit is configured to split the comment data stored in the structured manner and acquire a plurality of comment contents corresponding to the target, the determination circuit is configured to sequentially analyze the plurality of comment contents acquired by the splitting circuit and determine the comment topic and the comment viewpoint of each of the plurality of comment contents;

the splitting circuit comprises a first splitting sub-circuit or a second splitting sub-circuit, the first splitting sub-circuit is configured to split the comment data stored in the structured manner through a predetermined word segmentation system and acquire the plurality of comment contents corresponding to the target, the second splitting sub-circuit is configured to split the comment data stored in the structured manner through a predetermined word segment filter and acquire the plurality of comment contents corresponding to the target, wherein the predetermined word segmentation filter comprises at least one of a historical comment topic or a historical comment viewpoint, the determination circuit further comprises a first comparison sub-circuit, a first determination sub-circuit, a second comparison sub-circuit, a second determination sub-circuit, and a third determination sub-circuit, the first comparison sub-circuit is configured to compare each of the plurality of comment contents with a predetermined topic database, the first determination sub-circuit is configured to determine the comment topic about each of the plurality of comment contents when the first comparison sub-circuit compares each of the comment contents with the predetermined topic database, the second comparison sub-circuit is configured to compare each of the plurality of comment contents with a predetermined viewpoint database, the second determination sub-circuit is configured to determine the comment viewpoint of each of the comment contents when the second comparison sub-circuit compares each of the comment contents with the predetermined viewpoint database, wherein the target is an online article.

11. The device according to claim 10,
wherein the first determination main circuit is further configured to acquire an overall assessment about the target in accordance with the comment topic and the comment viewpoint.

12. The device according to claim 10, wherein the first determination main circuit is further configured to:
analyze the comment data and acquire the comment topic about the target, and
determine the comment viewpoint about the target in accordance with the comment data and the comment topic.

13. The device according to claim 10, further comprising:
a second acquisition main circuit, configured to acquire a total amount of the comment data;
an establishment main circuit, configured to establish an amount histogram in accordance with the total amount of the comment data acquired by the second acquisition main circuit;
a second determination main circuit, configured to determine a variation trend of the comment data in accordance with the amount histogram established by the establishment main circuit; and
an exhibition main circuit, configured to visually exhibit the variation trend determined by the second determination main circuit.

14. A system for analyzing comment data about a target, comprising:
a processor and a storage,
wherein, the storage is configured to store programs and data executable by the processor,
the processor is configured to execute the programs and the data stored in the storage so as to implement the method according to claim 1.

15. A non-transitory computer-readable storage medium, comprising:
computer instructions stored on the non-transitory computer-readable storage medium, wherein when the computer instructions are executed by a processor, the processor implements the method according to claim 1.

* * * * *